(12) United States Patent
Moeller et al.

(10) Patent No.: US 9,444,814 B2
(45) Date of Patent: Sep. 13, 2016

(54) METHOD AND SYSTEM FOR THE PROVISION OF SERVICES FOR TERMINAL DEVICES

(75) Inventors: Wolf-Dietrich Moeller, München (DE); Murugaraj Shanmugam, Bonn (DE); Hannes Tschofenig, Espoo (FI)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1749 days.

(21) Appl. No.: 12/450,208

(22) PCT Filed: Mar. 3, 2008

(86) PCT No.: PCT/EP2008/052568
§ 371 (c)(1),
(2), (4) Date: Dec. 8, 2010

(87) PCT Pub. No.: WO2008/113674
PCT Pub. Date: Sep. 25, 2008

(65) Prior Publication Data
US 2011/0083169 A1    Apr. 7, 2011

(30) Foreign Application Priority Data
Mar. 16, 2007 (DE) .............. 10 2007 012 749

(51) Int. Cl.
*H04L 29/06* (2006.01)

(52) U.S. Cl.
CPC ....... *H04L 63/0853* (2013.01); *H04L 63/0815* (2013.01); *H04L 63/0823* (2013.01); *H04L 63/101* (2013.01); *H04L 63/12* (2013.01)

(58) Field of Classification Search
CPC .................................................. H04L 63/0823
USPC .......................................................... 726/27
See application file for complete search history.

(56) References Cited

U.S. PATENT DOCUMENTS

| | | | |
|---|---|---|---|
| 7,194,480 B2* | 3/2007 | Shalabi et al. | |
| 7,392,546 B2 | 6/2008 | Patrick | |
| 7,634,807 B2* | 12/2009 | Yan et al. | 726/22 |
| 7,765,584 B2* | 7/2010 | Roskind | 726/5 |
| 7,836,080 B2* | 11/2010 | DeBie | 707/785 |
| 7,853,643 B1* | 12/2010 | Martinez et al. | 709/203 |
| 2001/0045451 A1 | 11/2001 | Tan et al. | |
| 2003/0065940 A1* | 4/2003 | Brezak et al. | 713/201 |
| 2004/0267645 A1* | 12/2004 | Pollari | 705/34 |
| 2005/0081055 A1* | 4/2005 | Patrick et al. | 713/200 |
| 2005/0120201 A1 | 6/2005 | Benaloh et al. | |

(Continued)

FOREIGN PATENT DOCUMENTS

| | | |
|---|---|---|
| EP | 1 672 555 A1 | 6/2006 |
| JP | 2004-533075 | 10/2004 |

(Continued)

OTHER PUBLICATIONS

International Search Report for Application No. PCT/EP2008/052568; mailed Jun. 24, 2008.

*Primary Examiner* — Shawnchoy Rahman
(74) *Attorney, Agent, or Firm* — Slayden Grubert Beard PLLC

(57) ABSTRACT

Services are provided for terminal devices, each having a TPM module. The TPM module of a terminal device transmits a service request with an ID assertion signed by a configurable credential to a server for the purpose of accessing the services of the server.

17 Claims, 3 Drawing Sheets

(56) References Cited

U.S. PATENT DOCUMENTS

| | | |
|---|---|---|
| 2005/0149729 A1* | 7/2005 | Zimmer et al. ............... 713/168 |
| 2005/0289347 A1* | 12/2005 | Ovadia ......................... 713/171 |
| 2006/0123472 A1 | 6/2006 | Schmidt et al. |
| 2006/0265598 A1* | 11/2006 | Plaquin et al. ............... 713/182 |
| 2007/0016941 A1 | 1/2007 | Gonzalez et al. |
| 2008/0046983 A1* | 2/2008 | Lester et al. ...................... 726/5 |
| 2008/0049752 A1* | 2/2008 | Grant ............................ 370/392 |
| 2009/0006850 A1* | 1/2009 | Birger et al. ................. 713/169 |

FOREIGN PATENT DOCUMENTS

| | | |
|---|---|---|
| JP | 2006-164247 | 6/2006 |
| JP | 2006-526184 | 11/2006 |
| WO | 2004/100487 A1 | 11/2004 |
| WO | 2006/103176 A1 | 10/2006 |
| WO | 2008/031043 A1 | 3/2008 |

* cited by examiner

METHOD AND SYSTEM FOR THE PROVISION OF SERVICES FOR TERMINAL DEVICES

CROSS REFERENCE TO RELATED APPLICATIONS

This application is the U.S. national stage of International Application No. PCT/EP2008/052568, filed Mar. 3, 2008 and claims the benefit thereof. The International Application claims the benefit of German Application No. 10 2007 012 749.0 filed on Mar. 16, 2007. Both applications are incorporated by reference herein in their entirety.

BACKGROUND

In known networks, users require so-called credentials as an ID assertion, for instance login names or passwords, in order to authenticate themselves in respect of the server and in order to gain access to its services. A credential is evidence to confirm an ID assertion of the user. Credentials are therefore authentication features and/or proof of authority. In known networks, like for instance the internet, there is however no transparency in the case of a services access. A user who would like access to different websites, which do not belong to the same web domain, must repeatedly authenticate him/herself for each website even if a service level agreement SLA exists between the different service providers. The reason for this is that known browsers are not able to transport evidence information data and/or credentials to other websites which do not belong to the current website domain. It is tiring for the user to input an ID assertion, for instance his/her login name or password, each time he/she changes domain.

With a so-called single sign-on (SSO) and/or a single logon, following a single authentication, a user can access all computers and services for which he is authorized, without having to reregister each time.

With known portals, the identity of a registered user is passed on to the parties constituting the portal without this being noticed by the user. With a single sign-on, the user only identifies him/herself once with the aid of an authentication method, for instance by entering a password. An SSO mechanism then assumes the object of authenticating the user. With portals, the user can initially log on once with the portal and is authenticated or roughly authorized there. To this end, the user obtains the feature of clearly having applications that are integrated within the portal. This feature represents a credential. With portals based on web technologies, this takes place in the form of so-called cookies for instance. With a portal, the user in this way obtains access to several web applications, whereby he/she does not have to log on separately.

A single sign-on despite cookies is nevertheless not possible if the user navigates and/or surfs outside the web domain.

SUMMARY

An aspect is to provide a method and a system for the provision of services for terminal devices, in which a user navigates through different domains despite only one logon.

The method provides services for terminal devices each of which has a TMP module (Trusted Platform Module), with the TPM module of a terminal device sending a service request with an ID assertion, which is signed by a configurable credential, to a server in order to access the services thereof.

In one embodiment of the method, after receiving the service request, the server validates the ID assertion with the credential and verifies the signature.

In one embodiment of the method, the credential is configured by a network operator in the TPM module of the terminal device.

In one embodiment of the method, the network operator in the TPM module of the terminal device configures an access control list ACL, which contains credentials associated with different servers for different services.

In one embodiment of the method, the credential is formed by a certificate of the network operator.

In one embodiment of the method, the ID assertion has:
user identity information data,
a certificate of the network operator,
a time stamp and
service-specific access restrictions.

In one embodiment of the method, the terminal device regularly sends a service usage report to a network operator.

In one embodiment of the method, the credentials are invalid after a predetermined life time.

In one embodiment of the method, the credential is formed by a security assertion mark-up language (SAML) credential.

In one embodiment of the method, the TMP module logs on to the respective server once.

Thus, the method may be implemented by a terminal device with a TPM module, which sends a service request with an ID assertion, which is signed by a configurable credential, to a server for access to the services thereof.

In one embodiment of the terminal device, this also has an single sign-on (SSO) module.

Further, the method may be implemented by a server for the provision of services for terminal devices, which each have a TPM module, with the server validating the credential for the provision of a service for the respective terminal device after receiving a service request with an ID assertion which is signed by a configurable credential and verifying the signature.

In addition, the method may be implemented by a system for the provision of services for terminal devices, which each have a TPM module, with a network operator configuring at least one credential in the respective TPM module of the terminal device and with the terminal devices each transmitting a service request with an ID assertion, which is signed by the respectively configured credential, to a server for access to the services thereof.

BRIEF DESCRIPTION OF THE DRAWINGS

These and other aspects and advantages of a method and system for provision of services for terminal devices will become more apparent and more readily appreciated from the following description of the exemplary embodiments, taken in conjunction with the accompanying drawings of which.

DETAILED DESCRIPTION OF THE PREFERRED EMBODIMENT

Figure 1:
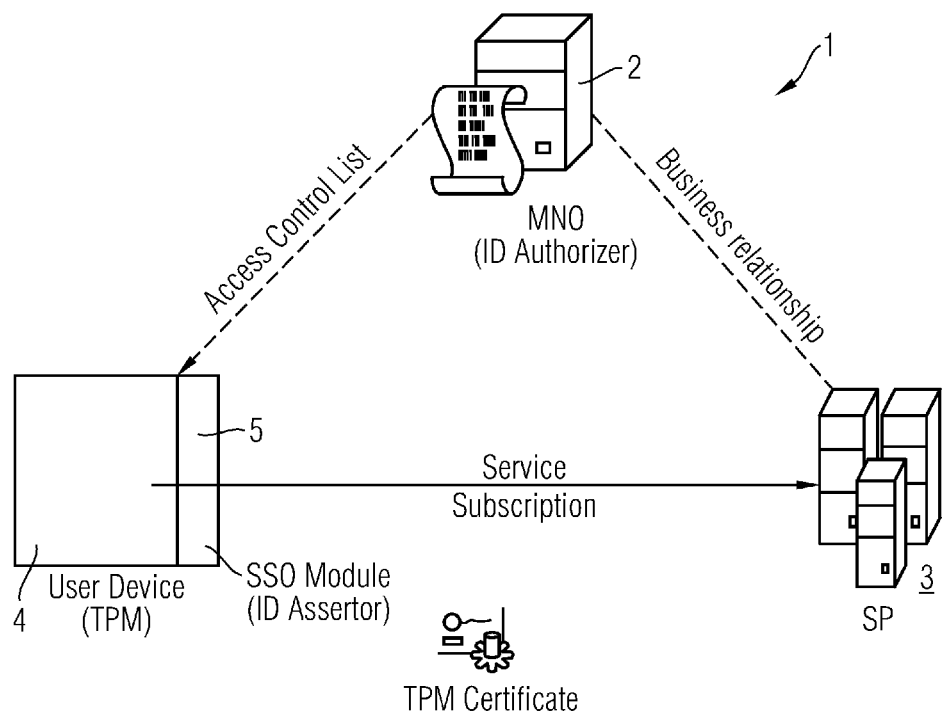
FIG. 1 is a pictorial block diagram illustrating one possible embodiment of the system for provision of services for terminal devices.

Reference will now be made in detail to the preferred embodiments, examples of which are illustrated in the accompanying drawings, wherein like reference numerals refer to like elements throughout.

As apparent from FIG. 1, the system 1 for the provision of services for terminal devices has at least one network operator 2 (NO), for instance a mobile network operator (MNO), which has business connections and/or a service level agreement SLA with service providers 3. Furthermore, the system 1 has a plurality of terminal devices 4, in particular mobile terminal devices 4. The terminal devices 4 each have a TPM module 5. The TPM module 5 is a chip for instance, which is integrated into the mobile terminal device 4. The TPM module 5 contains a unique identifier and is used to uniquely identify the mobile terminal device 4. As apparent from FIG. 1, in the system 1 the functionality of the identity provider IDP is separated between an ID authorizer, i.e. the network operator 2, and a unit for generating an ID assertion, which is formed for instance by a single sign-on module (SSO) within the TPM module 5 of the terminal device 4.

An authentication of the SSO module firstly takes place within the TPM module 5 by the ID authorizer and/or the network operator 2, which then generates a credential in a configuration phase and transmits it via a secure data connection to the mobile terminal device 4. The credential is formed by a certificate (delegation certification) for instance and is stored there after the transmission from the network operator 2 to the TPM module 5. In one embodiment, the certificate expires after a certain life time. In one possible embodiment, the network operator 2 generates an access control list ACL and transmits this for the configuration of the terminal device 4 to the respective TPM module 5. The access control list ACL contains credentials associated with different servers 3 of different services. The access control list ACL establishes a link between certain access rights and a list of users and/or terminal devices 4. The transmitted access control list ACL allows the terminal device 4 subsequent access to services for the respective server 3. The access control list ACL specifies which services and/or servers require which identity and which token and/or which credential is to be transmitted under which circumstances.

Figure 2:
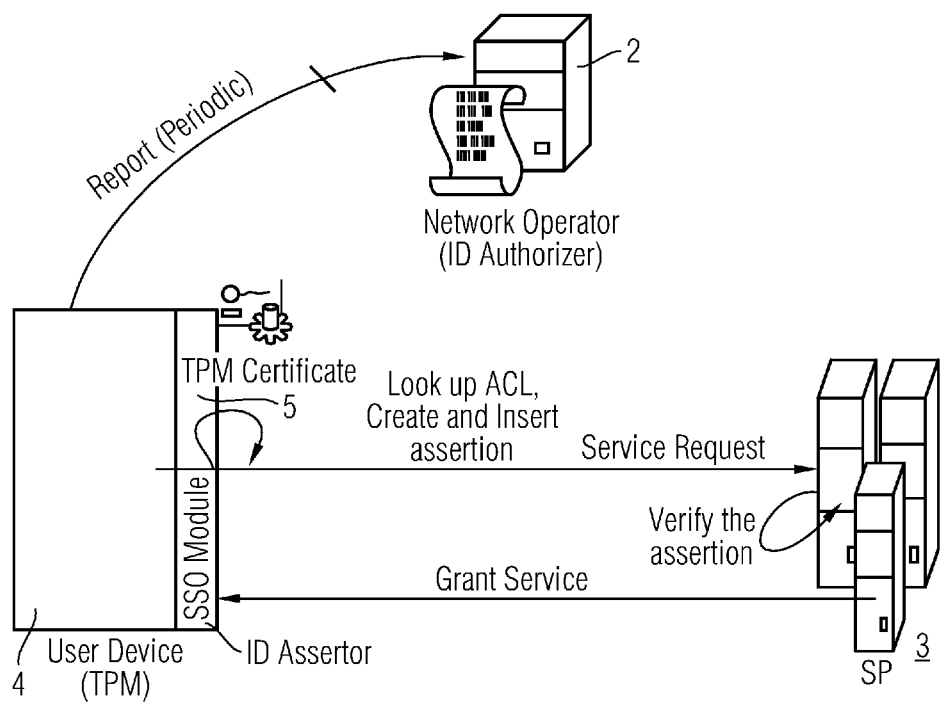
FIG. 2 is a pictorial block diagram illustrating a services access in one possible embodiment of the system for provision of services for terminal devices.

FIG. 2 shows the access to the service of a server 3 of a service provider by a terminal device 4 with configured TPM modules 5. As apparent from FIG. 2, no online connection between the terminal device 4 and the authorization unit and/or the network operator 2 is needed for access to the service of the server 3. The certificate of the network operator 2 is installed in the terminal device 4 and the access control list ACL is configured there. The TPM module has a single sign-on unit (SSO), which reads out the information contained in the TPM module from the access control list ACL upon a request for a desired service. The TPM module 5 inserts an ID assertion to a service request and signs the ID assertion by a credential read out from the access control list ACL.

In one possible embodiment, the ID assertion has user identity information data, a certificate of the network operator 2, a time stamp and service-specific access restrictions. The ID assertion is formed for instance by a security assertion mark-up language (SAML). The security assertion mark-up language is an XML-based language for transmitting identity information. The server 3 of the service provider SP receives the service request, which contains the ID assertion. The server 3 firstly generates the credential, for instance the certificate, and verifies the digital signature, in order to decide whether the mobile terminal device 4 is allowed access to the service. The server 3 then transmits a message, which advises the mobile terminal device 4 whether or not access is allowed to the service.

In one possible embodiment, the mobile terminal device 4 transmits a service usage report and/or report to the network operator 2 at periodic time intervals. The report contains additional information relating to the number of ID assertions generated per day and/or per week as well as information from the TPM module 5 for the ID provider and/or network provider 2 for the purpose of statistical evaluation and billing for instance. The TPM module 5 ensures that these reports cannot be manipulated.

As soon as the user and/or the terminal device 4 are no longer to have access to the service from the point of view of the network operator 2, as a result for instance of exceeding credit or a theft notification of the mobile terminal device 4, the corresponding credentials for the respective service and/or for all services are withdrawn and/or blocked. In one possible embodiment, the network operator 2 has a so-called revocation list, in which withdrawn credentials are stored. In an interactive procedure, the credentials to be withdrawn for blocking the credentials within the TPM module 5 are transmitted from the network operator 2 to the mobile terminal device 4.

Figure 3:
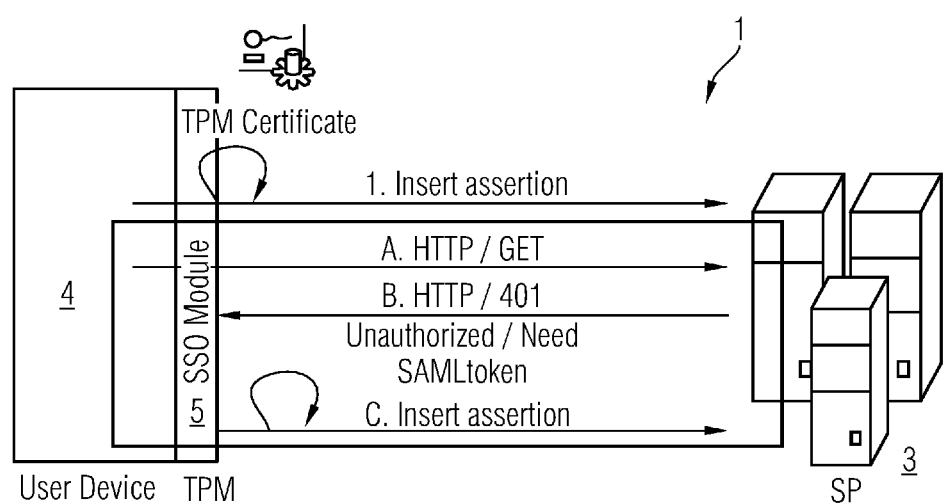
FIG. 3 is a pictorial block diagram illustrating another services access in one possible embodiment of the system for provision of services for terminal devices.

FIG. 3 shows one possible scenario in a TPM based single sign-on in the system 1. In the embodiment shown in FIG. 3, HTTP/SIP data transmission protocols with access to the service and/or service of the server 3 of the service provider SP are used. In the mobile terminal device 4, preconfigured federation information data is stored. Federation is understood to mean an organization, in which several subscribers, which have a certain independence, are combined across enterprise boundaries. Identity data is securely exchanged here across security domains. If an application and/or application program running on the mobile terminal device 4 generates a get/post request for a service of the server 3, then the SSO module within the TPM module 5 transparently inserts an ID assertion by using the credentials installed by the network operator 2, provided a corresponding entry is present in the access control list ACL of the SSO module which contains the information relating to the type of the individual token or other information relating to the service. Provided no entry exists in the access control list ACL, the SSO module within the TPM module 5 forwards the service request and/or request (HTTP/GET) to the server 3 of the service provider SP. The server 3 shows in a further message to the SSO module within the TPM module 5 that the user and/or the terminal device 4 is still not authenticated and that the server 3 expects a credential, for instance an SAML token. Once the TPM module 5 has received the message from the server 3, it generates an ID assertion and sends the ID assertion signed with a credential together with the credential, for instance the certificate, to the server 3 of the service provider SP. The server 3 implements the authentication with the aid of the ID assertion.

An entry is also generated in the access control list ACL by the network operator 2 and is stored in the SSO module for future service requests.

Once the authenticity authorizer and/or the network operator 2 authenticate and/or initialize the SSO module within the TPM unit, the TPM module 5 can be deemed trustworthy and is provided with the necessary credentials in order to sign ID assertions.

In one alternative embodiment, the authentication takes place per implemented session (user session). This can take place on the one hand on the basis of an authentication compared with the network operator 2 or any other network unit, with the result being stored in the SSO module of the mobile terminal device 4, for instance by using AKA between an xSIM and the network operator. Alternatively, based on some of the credentials, for instance on the basis of a user name or password, which are digitally stored and can be locally verified, the authentication can take place within the SSO module of the TPM unit.

In one possible realization of the system 1, the identity authorizer and/or the network operator 2 in a configuration phase configure a federation logic across an interface such that all relevant information, like for instance user identify, service identify and type of credential is configured. The configured information enables the SSO module to fulfill its task by it mapping the identities in the service request onto the configuration federation information. If no entry of this type of information is present in the SSO module, this does not insert any ID assertion and/or token into the service request, but instead forwards the corresponding service request. This may then be the case for instance if the user has no subscription entry in the SSO module but would like to use SSO. In this case, the server specifies a 401/302 reply message for the incoming service request with the token information expected from him. The TPM module 5 stores the response of the server 3 and processes this. Finally, the TPM module 5 inserts the necessary token and resends a service request for the corresponding service. Furthermore, the TPM module 5 triggers a corresponding entry in the SSO module, which specifies the service, the token type etc. for subsequent service requests.

In one embodiment, the SSO module is configured in the configuration phase such that it has a list of federation logics and makes the necessary federation information available to the respective user. To this end, the TPM/SSO module identifies the logged-in user processes which are running and the respective service requests thereof. If a user changes the network operator 2 or if the network operator and/or identity authorizer determines an impermissible activity on the part of the user, the existing federation information can be withdrawn. This withdrawal and/or blockage can take place centrally without interaction from the respective TPM module 5. If the user has different accounts with the network operator 2, the federation logic is accompanied by the currently logged in account with the network operator 2. The federation logic is managed by the mobile terminal device 4. Authorized applications have access to the federation information. Each network operator 2 has access to the configuration information of the terminal device 4, in order to bootstrap the federation logic during a subscription phase in a new service provider SR The TPM/SSO application likewise has access to the federation logic in order to generate credentials.

The system 1 is advantageous in that the transmission of the ID assertions takes place advantageously. This occurs by the authorization of a user by a central identity provider IDP being delegated on the terminal device 4 and/or being output hereto. As a result of this divided approach, the network operator 2 and/or the identity provider can make considerable resource savings. The operating costs of a network operator reduce significantly in this way.

One further advantage of the system 1 arises from the mobile terminal device 4 not requiring any online connection to the network operator 2 for access to services of the service provider SP.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for provision of services for terminal devices, each of which has a trusted platform module, comprising:
    configuring, by a network operator in a trusted platform module of a terminal device, an access control list containing credentials associated with different servers for different services; and
    sending, by the trusted platform module of the terminal device, a service request with an identification assertion, signed by a configurable credential, to a server for access to the services thereof, if the configurable credential exists as an entry in the access control list.

2. The method as claimed in claim 1, further comprising by the server on receipt of the service request with the identification assertion,
    validating the credential; and
    verifying a signature included in the identification assertion.

3. The method as claimed in claim 1, further comprising configuring the credential by the network operator in the trusted platform module of the terminal device.

4. The method as claimed in claim 1, further comprising forming the credential using a certificate of the network operator.

5. The method as claimed in claim 1, wherein the identification assertion includes user identity information data, a certificate of the network operator, a time stamp and service-specific access restrictions.

6. The method as claimed in claim 1, further comprising the terminal device regularly sending a useful service usage report to a network operator.

7. The method as claimed in claim 1, wherein the credential becomes invalid after a predetermined lifetime.

8. The method as claimed in claim 1, further comprising forming the identification assertion based on a security assertion mark-up language identification assertion.

9. The method as claimed in claim 1, further comprising initially registering the trusted platform module with the respective server.

10. A terminal device communicating with a server, comprising:
    a trusted platform module sending a service request with an identification assertion, signed by a configurable credential, to the server for access to services provided by the server, if the configurable credential exists as an entry in an access control list containing credentials associated with different servers for different services and being configured by a network operator in the trusted platform module of the terminal device.

11. The terminal device as claimed in claim 10, further comprising a single sign-on module.

12. A server for provision of services for at least one terminal device having a trusted platform module, comprising:
a receiver receiving from the at least one terminal device a service request with an identification assertion, signed by a configurable credential, for access to services provided by the server, if the configurable credential exists as an entry in an access control list containing credentials associated with different servers for different services and being configured by a network operator in the trusted platform module of the at least one terminal device; and
a processor programmed to perform operations following receipt of the service request with the identification assertion signed by a configurable credential, including validating the credential for the provision of at least one service for the at least one terminal device and verifying a signature included in the identification assertion.

13. A system for provision of services, comprising:
terminal devices, each having a trusted platform module with a network operator configuring credentials and sending service requests with identification assertions, signed by a configured credential, for access to a service if the configurable credential exists as an entry in an access control list containing credentials associated with different servers for different services and being configured by the network operator therein; and
a server validating the credential for the provision of at least one service for one of the terminal devices and verifying a signature included in the identification assertion.

14. The method as claimed in claim 1, wherein the identification assertion signed by the configurable credential obtained from the access control list by the trusted platform module of the terminal device is sent by the trusted platform module of the terminal device to the server to obtain access to the services provided by the server after verification of the configurable credential by the server.

15. The terminal device as claimed in claim 10, wherein the identification assertion signed by the configurable credential obtained from the access control list by the trusted platform module of the terminal device is sent by the trusted platform module of the terminal device to the server to obtain access to the services provided by the server after verification of the configurable credential by the server.

16. The server as claimed in claim 12, wherein the identification assertion signed by the configurable credential obtained from the access control list by the trusted platform module of the at least one terminal device is sent by the trusted platform module of the at least one terminal device to the server to obtain access to the services provided by the server after verification of the configurable credential by the server.

17. The system as claimed in claim 13, wherein the identification assertion signed by the configurable credential obtained from the access control list by the trusted platform module of the one of the terminal devices is sent by the trusted platform module of the one of the terminal devices to the server to obtain access to the services provided by the server after verification of the configurable credential by the server.

* * * * *